United States Patent
Leshem

(10) Patent No.: US 6,554,241 B1
(45) Date of Patent: Apr. 29, 2003

(54) VACUUM CUP

(75) Inventor: Nadav Leshem, D. N. Biqaat Beit Hakerem (IL)

(73) Assignee: Smart Robotics, Hakerem (IL)

(*) Notice: Subject to any disclaimer, the term of this patent is extended or adjusted under 35 U.S.C. 154(b) by 0 days.

(21) Appl. No.: 10/076,409

(22) Filed: Feb. 19, 2002

(51) Int. Cl.$^7$ ............................................. A45D 42/14
(52) U.S. Cl. ..................... 248/362; 248/205.5; 248/363
(58) Field of Search ................................ 248/362, 363, 248/205.5, 205.6, 205.7, 206.2; 446/177, 180, 489; 180/164

(56) References Cited

U.S. PATENT DOCUMENTS

| | | | |
|---|---|---|---|
| 3,209,849 A | | 10/1965 | Gondert et al. |
| 3,268,023 A | * | 8/1966 | Di Napoli, Jr. .............. 180/164 |
| 3,628,625 A | * | 12/1971 | Boyles, Jr. .................. 180/127 |
| 4,018,541 A | * | 4/1977 | Denikin et al. ............. 180/164 |
| 4,971,591 A | | 11/1990 | Raviv et al. |
| 5,014,803 A | | 5/1991 | Urakami |
| 5,536,199 A | | 7/1996 | Urakami |
| 6,276,478 B1 | * | 8/2001 | Hopkins et al. ............. 114/222 |

FOREIGN PATENT DOCUMENTS

| | | | |
|---|---|---|---|
| DE | 3403636 A1 | * | 8/1985 |
| FR | 2724644 A1 | * | 3/1996 |
| JP | 6 271148 | * | 6/1994 |

* cited by examiner

*Primary Examiner*—Ramon O. Ramirez
(74) *Attorney, Agent, or Firm*—Browdy and Neimark, P.L.L.C.

(57) ABSTRACT

A vacuum device for attaching an object to a surface, comprising a body fixable to the object and a piston connected to the body along a first sealing contour, thereby defining with the body a first chamber. The piston has a protruding sealing lip adapted to contact the surface along a second sealing contour, thereby defining with the surface a second chamber. The two chambers are connected to a source of vacuum, and are preferably in fluid communication with each other. The piston is movable with respect to the body by the action of the vacuum in the first chamber and/or by an external force due to the contact of the sealing lip with the surface. The sealing lip is urged to the surface by a first sealing force due to the action of the vacuum in the second chamber. The vacuum device further comprises a spring connected to the piston and the body so as to deform when the piston moves with respect to the body. Thus the spring creates a second sealing force urging the sealing lip towards the surface, and his force is independent of the vacuum in the second chamber.

25 Claims, 4 Drawing Sheets

VACUUM CUP

FIELD OF THE INVENTION

This invention relates to vacuum devices for attaching objects to a surface, and more specifically to vacuum cups adapted to operate in transient conditions such as on a traveling object, rough surface or vibrating surface.

BACKGROUND OF THE INVENTION

Vacuum devices such as vacuum suction cups or cushions are used on vehicles crawling along a steep slope, along a vertical wall or even along an overhead surface. In this case the attraction force of the vacuum cup has to overcome completely or partially the weight of the vehicle and to provide for some residual force urging the vehicle to the surface.

Another use of the vacuum cups is on road vehicles with the purpose of increasing the force attracting the vehicle to the road surface. This is useful when the available traction force of such vehicle depends on the friction force with the road surface and it is not desirable to increase the Fiction force by increasing vehicle's weight, for example in a relatively light vehicle towing a heavy weight.

A typical vacuum device (suction cup) for a traveling vehicle is described, for example, in U.S. Pat. No. 4,971,591. The device comprises a body 1 mounted to the vehicle 2 and defining a pressure reduction space (vacuum chamber) 3 with effective area S in cooperation with the wall surface 4, as shown schematically in FIG. 1. The vacuum chamber 3 is sealed to the surface 4 by a flexible circumferential lip 5 attached to the body 1, contacting the wall surface 4 and sliding therealong. A vacuum pump 6 reduces the pressure in the chamber to create pressure differential $\Delta P$ with the ambient atmospheric pressure outside the chamber (called just "vacuum" hereinafter). The device can adhere to the wall owing to the vacuum that creates a suction force $F_U = \Delta P \cdot S$. Since the vehicle abuts the wall surface 4 also by other elements suck, as traction wheels 7, track chains or supports, the suction force is divided into "attaching force" $F_A$ and "sealing force" $F_S$, so that $F_S + F_A = F_U$. The attaching force $F_A$ urges the vehicle (the wheels 7) to the surface 4 while the sealing force $F_S$ urges the seal 5 to the surface 4. The higher the vacuum, the higher are the suction force, the sealing force, and the attaching force.

The sealing between the surface and the vacuum cup can never be perfect, therefore always exists some non-uniform leakage into the vacuum chamber, especially when the cup is sliding past the surface. Even in the case when the vacuum cup is designed to slide over a rough surface or at some small clearance with a constant leakage flow, there are perturbations in the leakage level. The non-uniform leakage results in sudden loss of vacuum. In such case, the above-described vacuum cup is prone to "collapse" of the suction force since a small loss of vacuum leads to a loss of the sealing force, further increase of the leakage, her loss of vacuum, etc. With devices designed to operate with small clearance, the same mechanism may also lead to a collapse of the clearance.

In order to cope with the collapse of the suction force, the above vacuum cup has to be operated with a substantial reserve of the vacuum, high sealing force and ensuing high friction in the seal-surface interface, powerful vacuum pump and other features which impair the efficiency of the vacuum device.

U.S. Pat. No. 4,971,591 discloses a vacuum traveling device with a vacuum chamber defined by a bell-like flexible skirt. The lower edge of the skirt contacts the surface and seals the chamber while the upper edge is fixed to a body mounted to a vehicle. On the other side of the body there is a second chamber closed by a flexible dome and connected to the vacuum chamber and to a vacuum pump. The dome is supported by a spring disposed in the second chamber and abutting the body. The dome is mechanically connected to an actuator of the vacuum pump. When the vacuum in the vacuum chamber and in the second chamber is high enough for the operation of the device, the dome partially collapses and compresses the spring. The flexible skirt is pressed against the surface. In this situation the actuator disengages the vacuum pump. Should a loss of vacuum occur, for example due to a local leak under the skirt edge, the spring lifts the dome and actuates the vacuum pump, thereby compensating the loss of vacuum.

U.S. Pat. No. 5,536,199 discloses a vacuum traveling device with a vacuum chamber defined by an inflatable seal, and a sealing-compensating means. A pressure sensor measures the vacuum in the vacuum chamber and, when a loss of vacuum is detected, a microprocessor controller switches a compressor to inflate the seal, thereby increasing the sealing force.

U.S. Pat. No. 3,209,849 discloses a vacuum attraction device for a road vehicle, operating without contact between the vacuum chamber seal and the road surface but maintaining a constant flow of air through a clearance therebetween. The vacuum chamber is arranged in series with an air spring chamber mounted on the vehicle frame. The vacuum pressure and the effective area of both chambers are equal. If the clearance closes a little, the flow therethrough decreases and the vacuum increases. The increased vacuum force between the seal and the surface is compensated by an equally increased force from the vacuum in the air spring chamber. As a result, the sealing force remains stable while the increased vacuum force in the air spring chamber shrinks it a little, withdraws the vacuum chamber and the seal from the surface, and thereby restores the clearance.

SUMMARY OF THE INVENTION

In accordance with the present invention, there is provided a vacuum device for attaching an object to a surface, either in fixed or in sliding relationship. The device comprises a body element fixable to said object and a piston element connected to the body element along a first sealing contour, thereby defining with the body element a first chamber. The piston element has a protruding sealing lip adapted to contact the surface along a second sealing contour, thereby defining with the surface a second chamber. The two chambers are connected to a source of vacuum, and are preferably in fluid communication with each other. The piston element is movable with respect to the body element by the action of a vacuum created in the first chamber and/or by an external force due to the contact of the sealing lip with the surface. The sealing lip is urged to the surface by a first sealing force due to the action of the vacuum in the second chamber. The first and the second sealing contours have respective projected areas $S_1$ and $S_2$ along the direction of motion of the piston element.

The vacuum device further comprises an elastic element or a spring connected to the piston element and the body element so as to deform when the piston element moves with respect to the body element. Thus the spring creates a second sealing force urging the sealing lip towards the surface, and this force is independent of the vacuum in the second chamber.

The vacuum device of the present invention operates in the following way: the sealing lip is brought in contact with the surface so as to close the second chamber. The source of vacuum creates vacuum $\Delta P$ in both chambers, and the piston element moves towards the body element creating a reaction force $F_R$ in the elastic element, which is the second sealing force. The piston element is urged to the surface by a total sealing force $F_S=F_R-\Delta P\cdot(S_1-S_2)$. The body element, together with the object, is urged to the surface by an attaching force $F_A=\Delta P\cdot S_1-F_R$. In case of a leak through the second sealing contour causing vacuum loss of $\delta P$, the total sealing force changes by $\delta F_S=\delta P\cdot(S_1-S_2)$. The amount of change $\delta F_S$ may be positive, negative, or zero, depending on the relative value of the areas $S_1$ and $S_2$. Due to the vacuum-independent component $F_R$, the total sealing force can not collapse.

In the particular case when $S_1$ is greater then $S_2$, the total sealing force even increases, thereby helping to close the leak.

The sealing lip may be adapted to slide along said surface when in contact therewith, it also may be adapted to seal completely or partially the second sealing contour. The sealing lip is preferably made of a resilient material; it may have a continuous structure or may comprise a plurality of resilient elements.

The first sealing contour may comprise a sliding vacuum seal or a flexible sleeve attached to the piston element and the body element. The flexible sleeve may be integral with the piston element or with the body element or with both.

The elastic element may be a spring or a resilient sleeve connected to the piston element and the body element. It may be also a sealing element connecting the piston element and the body element along the first sealing contour. The elastic element may be preloaded with a predetermined reaction force.

The vacuum device of the present invention provides for a vacuum-independent component of the sealing force by simple constructional means. Therefore, the inevitable perturbations of the leak flow into the vacuum cup due to sliding motion, uneven surface or vibrations do not lead to a collapse of the sealing force and of the attaching function. A negative feedback between the loss of vacuum in the vacuum chamber and the sealing force may be obtained, whereby the perturbations may be suppressed by an opposite change of the sealing force. This fact allows the creation of lightweight vacuum cups with minimal but reliable sealing force, usage of light vacuum pumps with minimal power consumption, minimal attaching force and minimal frictional resistance to motion.

The action of the elastic element and therefore the second sealing force does not depend on the gravity force direction. This is suitable for the application of the vacuum device on crawling vehicles for steep, vertical or overhead walls.

BRIEF DESCRIPTION OF THE DRAWINGS

In order to understand the invention and to see how it may be carried out in practice, a few embodiments will now be described, by way of non-limiting example only, with reference to the accompanying drawings, in which.

DETAILED DESCRIPTION OF THE INVENTION

Figure 2:
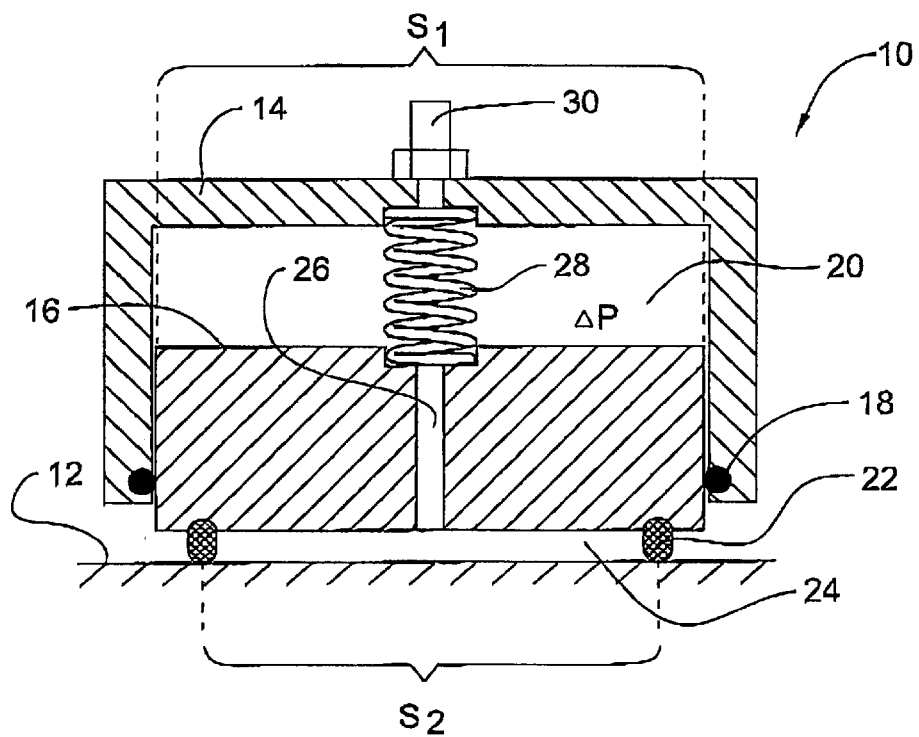
FIG. 2 is a schematic section of a vacuum cup in accordance with the present invention.

With reference to FIG. 2, in accordance with the present invention, there is shown a vacuum device (vacuum cup) 10 for attaching an object (not shown) to a surface 12, either in fixed or in sliding relationship. The device comprises a body 14 fixable to the object and a piston 16 movably connected to the body 14 by means of a sliding vacuum seal 18. The piston 16 and the body 14 define a first vacuum chamber 20 with changeable volume due to the motion of the piston 16. The vacuum seal 18 represents a first sealing contour. The piston 16 has a protruding sealing lip 22 adapted to contact the surface 12 along a second sealing contour. The piston 16, the sealing lip 22 and the surface 12 define a second vacuum chamber 24. The two vacuum chambers are in fluid communication via the opening 26. The device further comprises a compression spring 28 disposed between the piston 16 and the body 14. The first chamber 20 is connected to a vacuum pump (not shown) through the nipple 30. The first and the second sealing contours have respective projected areas $S_1$ and $S_2$ along the direction of motion of the piston.

Figure 1:
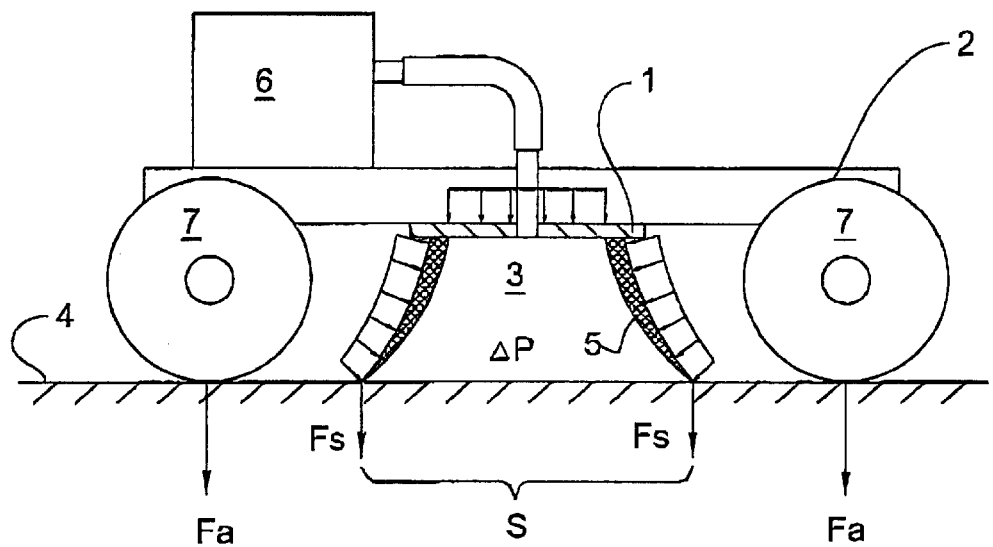
FIG. 1 is a schematic section of a prior art vacuum cup.
Figure 3A:
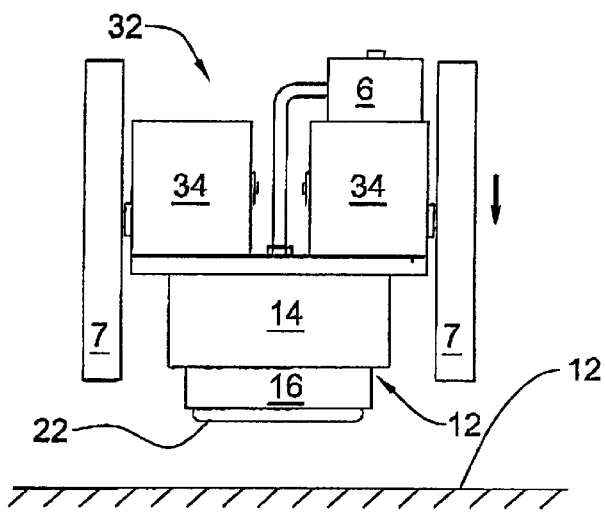
FIGS. 3A, 3B, and 3C illustrate the usage of the vacuum cup of the present invention in a wheeled vehicle.
Figure 3B:
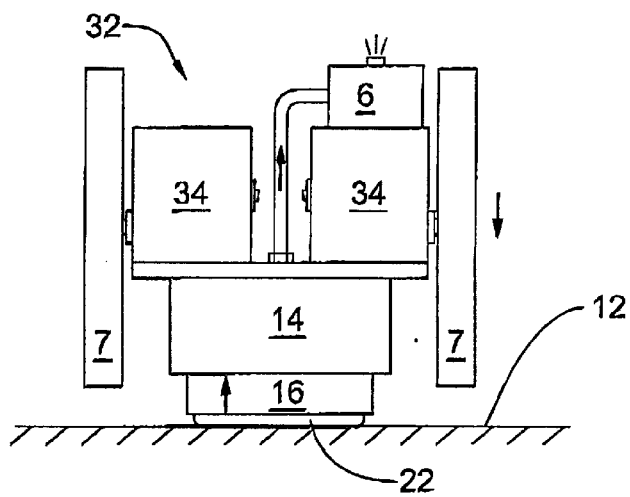

The operation of the vacuum cup 10 will be explained with reference also to FIGS. 3A, 3B, and 3C where the device is shown mounted to a platform 32 having wheels 7 with drives 34, and vacuum pump 6, similar to the vehicle in FIG. 1. In FIG. 3A, the platform 32 and the vacuum cup 10 move towards the surface 12 but still are not in contact therewith. The spring 28 (see FIG. 2) is not compressed. In FIG. 3B, the sealing lip 22 of the piston 16 abuts the surface 12 and closes the second vacuum chamber 24. The vacuum pump 6 starts to operate and creates a predetermined level of vacuum $\Delta P$ in both chamber 20 and 24. The piston 16 moves into the body 14 and starts to compress the spring 28 creating a reaction force $F_R$.

Figure 3C:
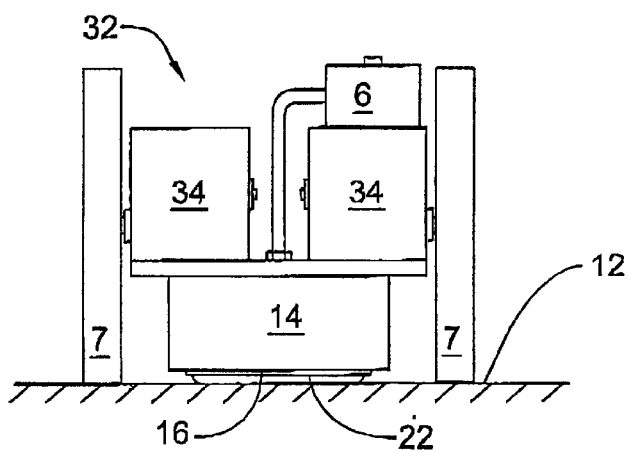

The motion of the platform towards the surface and the motion of the piston into the body continue until the wheels 7 abut the surface 12, as shown in FIG. 3C. In this position, the reaction force is $F_R=K\cdot\Delta X$ where $\Delta X$ is the deformation of the spring, and K is the elastic modulus of the spring. The piston 16 and the sealing lip 22 are urged to the surface 12 by a first sealing force $F_{1S}=\Delta P\cdot S_2$. The reaction force $F_R$ also urges the sealing lip 22 to the surface and constitutes a second sealing force. The vacuum in the first chamber however, acts in opposition to the sealing forces with a force equal to $\Delta P\cdot S_1$. Therefore, the total sealing force is $$F_S=F_R-\Delta P\cdot(S_1-S_2).$$

The wheels 7 are urged to the surface 12 by an attaching force $F_A=\Delta P\cdot S_1-F_R$. The vacuum pump 6 maintains the vacuum $\Delta P$. This state of the vacuum cup 10 is shown also in FIG. 2.

In case of a leak through the second sealing contour causing vacuum loss of $\delta P$, the total sealing force $F_S$ changes by $\delta F_S=\delta P\cdot(S_1-S_2)$. The amount of change $\delta F_S$ may be positive, negative, or zero, depending on the relative value of the areas $S_1$ and $S_2$. Due to the vacuum-independent component $F_R$, the total sealing force can not collapse.

In the particular case when $S_1$ is greater then $S_2$, the total sealing force even increases, thereby helping to close the leak.

Thus, the vacuum device of the present invention compensates for transient leakage and does not collapse because of pressure loss. From physical point of view, the novel vacuum device does not use the whole disposable suction force $\Delta P \cdot S_1$ for attaching but stores part of it, namely the reaction force $F_R$, in the spring 28 for compensation of sudden leakage and pressure loss.

In the position illustrated in FIGS. 2 and 3 where the surface 12 is below the vacuum cup, the weight W of the piston 16 cooperates with the reaction force $F_R$. However, his is not necessary for the operation of the device. It is understood that the piston 16 may be produced from light materials, with small mass, such that $W \ll F_R$. In this case the weight will have negligible effect on the sealing force, which is suitable for the usage of the vacuum cup in inverted position (with the surface overhead).

The novel vacuum cup allows the creation of lightweight vacuum cups with reliable sealing force, the usage of light vacuum pumps with minimal power consumption, usage of minimal sealing force and therefore minimal frictional resistance to motion.

Besides the advantageous behavior of the sealing force, the novel vacuum cup has other advantages:

The ratio of the attaching and the sealing force can be conveniently adjusted by preloading the spring or by selection of an appropriate spring;

The piston with the sealing lip protrudes beyond the line of the wheels, which facilitates the easy attaching to the surface without a need for other mechanisms;

The action of the elastic element and therefore the second sealing force does not depend on the gravity force direction which is suitable for the application of the vacuum device on crawling vehicles for steep, vertical or overhead walls.

Though an example has been given with a wheeled platform, the novel vacuum cup can be advantageously used with other traveling vehicles, as well as in non-movable supports on vibrating, rolling or otherwise unstable surfaces.

Multiple constructive variations of the inventive vacuum cup are possible in the framework of the above-described general principle, some of them being shown in FIGS. 4A to 4D, 5A and 5B.

Figure 4A:
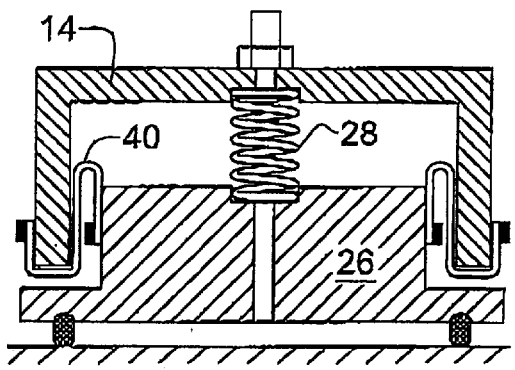
FIGS. 4A, 4B, 4C and 4D show structural variations of the vacuum cup of FIG. 2.
Figure 4B:
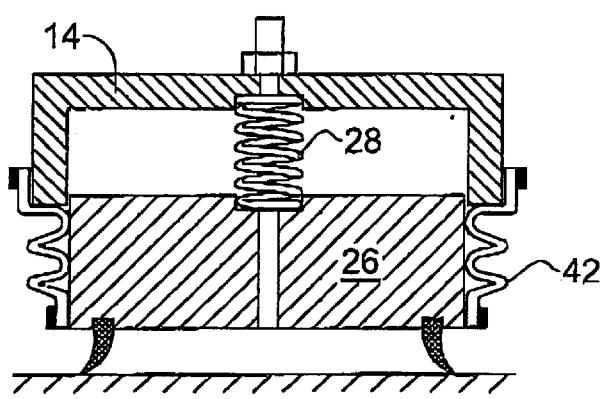

The first sealing contour may comprise a flexible sleeve attached to the piston element and the body element, either as a straight sleeve 40 as shown in FIG. 4A, or formed as bellows 42, as shown in FIG. 4B. The flexible sleeve may be integral With the piston element or with the body element or with both.

The sealing lip may be adapted to slide along said surface when in contact therewith, it also may be adapted to seal completely or partially the second sealing contour. The sealing lip is preferably made of a resilient material; it may have a continuous structure or may comprise a plurality of resilient elements.

Figure 4C:
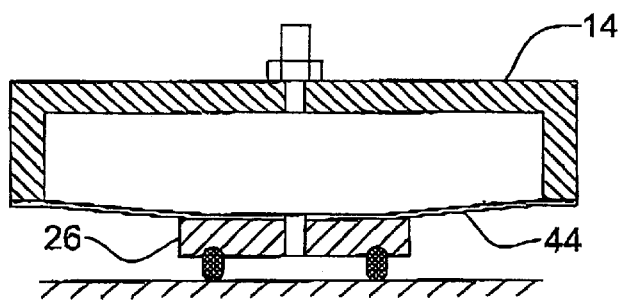
Figure 4D:
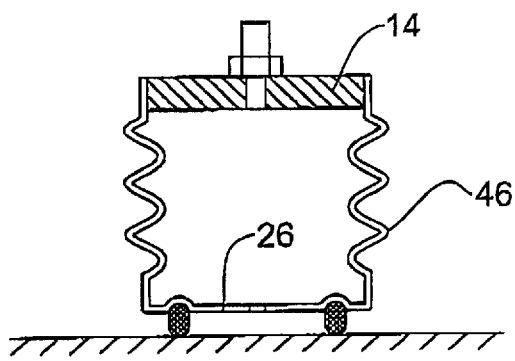
Figure 5A:
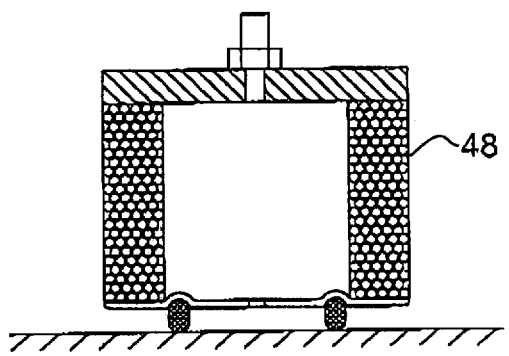
FIGS. 5A and B show another structural variation of the vacuum cup of FIG. 2.
Figure 5B:
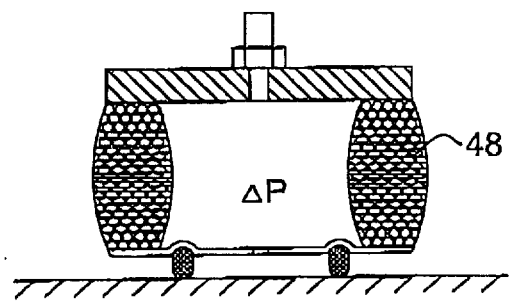

The elastic element may be a spring or a resilient sleeve connected to the piston element and the body element, for example a diaphragm 44, as shown in FIG. 4C, or a sylphon 46, as shown in FIG. 4D. A spongy polymer material 48 also may be used, as shown in FIGS. 5A and 5B. In the embodiments shown in FIGS. 4C, 4D, and 5A, 5B, the elastic element is also a sealing element connecting the piston element and the body element along the first sealing contour.

Although a description of specific embodiments has been presented, it is contemplated that various changes could be made without deviating from the scope of the present invention. For example, the fluid communication between chambers may be outside the piston, the elastic element may be located outside of the chambers, etc.

I claim:

1. A vacuum device for attaching an object to a surface, comprising a body element fixable to said object;

a piston element connected to said body element along a first sealing contour, thereby defining with said body element a first chamber, said piston element having a protruding sealing lip adapted to contact said surface along a second sealing contour, thereby defining with said surface a second chamber;

said two chambers being connectable to a source of vacuum;

said sealing lip being urged to said surface by a first sealing force due to the action of a vacuum created in said second chamber, said piston element being movable with respect to said body element by the action of a vacuum created in said first chamber and/or by an external force due to the contact of said sealing lip with said surface;

wherein said vacuum device further comprises an elastic element connected to said piston element and said body element so as to deform when said piston element moves with respect to said body element, thereby creating a second sealing force urging said sealing lip towards said surface, which force is independent of said vacuum in said second chamber.

2. A vacuum device according to claim 1, wherein said first and said second chamber are in fluid communication with each other.

3. A vacuum device according to claim 1, wherein said first and said second sealing contours have respective projected areas $S_1$ and $S_2$ along the direction of motion of said piston element and the projected area $S_1$ of the first contour is greater than the projected area $S_2$ of the second contour.

4. A vacuum device according to claim 1, wherein said sealing lip is adapted to slide along said surface when in contact therewith.

5. A vacuum device according to claim 1, wherein said sealing lip comprises a plurality of resilient elements.

6. A vacuum device according to claim 1, wherein said first sealing contour comprises a flexible sleeve attached to the piston element and to the body element.

7. A vacuum device according to claim 6, wherein said piston element and said flexible sleeve are integral with said body element.

8. A vacuum device according to claim 1, wherein said elastic element is a spring connected to said piston element and said body element.

9. A vacuum device according to claim 1, wherein said elastic element is a resilient sleeve connecting said piston element and said body element.

10. A vacuum device according to claim 9, wherein said resilient sleeve is an integral part of said body element.

11. A vacuum device according to claim 9, wherein said resilient sleeve is an integral part of said piston element.

12. A vacuum device according to claim 1, wherein said elastic element is also a sealing element connecting said piston element and said body element along the first sealing contour.

13. A vacuum device according to claim 1, wherein said elastic element is adapted to be preloaded with a predetermined second sealing force.

14. A vacuum device for attaching an object to a surface, comprising a body element fixable to said object;

a piston element connected to said body element along a first sealing contour, thereby defining with said body element a first chamber, said piston element having a protruding sealing lip adapted to contact said surface along a second sealing contour, thereby defining with said surface a second chamber;

said two chambers being connectable to a source of vacuum;

said sealing lip being urged to said surface by a first sealing force due to the action of a vacuum created in said second chamber, said piston element being movable with respect to said body element by the action of a vacuum created in said first chamber and/or by an external force due to the contact of said sealing lip with said surface;

wherein said vacuum device further comprises an elastic element connected to said piston element and said body element so as to deform when said piston element moves to reduce the volume of said first chamber, thereby creating a second sealing force urging said sealing lip towards said surface, which force is independent of said vacuum in said second chamber.

15. A vacuum device according to claim 14, wherein said first and said second chamber are in fluid communication with each other.

16. A vacuum device according to claim 14, wherein said first and said second sealing contours have respective projected areas $S_1$ and $S_2$ along the direction of motion of said piston element and the projected area $S_1$ of the first contour is greater than the projected area $S_2$ of the second contour.

17. A vacuum device according to claim 14, wherein said sealing lip is adapted to slide along said surface when in contact therewith.

18. A vacuum device according to claim 14, wherein said sealing lip comprises a plurality of resilient elements.

19. A vacuum device according to claim 14, wherein said first sealing contour comprises a flexible sleeve attached to the piston element and to the body element.

20. A vacuum device according to claim 14, wherein said piston element and said flexible sleeve are integral with said body element.

21. A vacuum device according to claim 14, wherein said elastic element is a spring connected to said piston element and said body element.

22. A vacuum device according to claim 14, wherein said elastic element is a resilient sleeve connecting said piston element and said body element.

23. A vacuum device according to claim 22, wherein said resilient sleeve is an integral part of said body element.

24. A vacuum device according to claim 22, wherein said resilient sleeve is an integral part of said piston element.

25. A vacuum device according to claim 14, wherein said elastic element is also a sealing element connecting said piston element and said body element along the first sealing contour.

* * * * *